(12) United States Patent
Squires

(10) Patent No.: US 9,363,990 B2
(45) Date of Patent: Jun. 14, 2016

(54) PASS AROUND ASSIST DEVICE

(71) Applicant: Hurricane Safety Systems, LLC, Traverse City, MI (US)

(72) Inventor: Timothy P. Squires, Williamsburg, MI (US)

(73) Assignee: Hurricane Safety Systems, LLC, Traverse City, MI (US)

( * ) Notice: Subject to any disclaimer, the term of this patent is extended or adjusted under 35 U.S.C. 154(b) by 0 days.

(21) Appl. No.: 14/589,207

(22) Filed: Jan. 5, 2015

(65) Prior Publication Data

US 2015/0190914 A1 Jul. 9, 2015

Related U.S. Application Data

(60) Provisional application No. 61/923,412, filed on Jan. 3, 2014.

(51) Int. Cl.
*B25J 1/02* (2006.01)
*A01M 31/02* (2006.01)

(52) U.S. Cl.
CPC .. *A01M 31/02* (2013.01); *B25J 1/02* (2013.01)

(58) Field of Classification Search
CPC ............... B25J 1/02; B25J 1/06; B25B 33/00; G01B 3/06
USPC .......... 294/22, 119, 175, 191, 209, 210, 211; 81/177.6; 33/458; 403/101
See application file for complete search history.

(56) References Cited

U.S. PATENT DOCUMENTS

| | | | | |
|---|---|---|---|---|
| 1,069,186 | A * | 8/1913 | Rudler | 403/101 |
| 1,226,172 | A * | 5/1917 | Benjamin | 403/97 |
| 1,227,206 | A * | 5/1917 | Schade | 403/101 |
| 1,431,389 | A * | 10/1922 | Frisz | 81/177.7 |
| 1,983,651 | A * | 12/1934 | Anderson et al. | 403/101 |
| 2,629,179 | A * | 2/1953 | Lindhe et al. | 403/111 |
| 2,663,940 | A * | 12/1953 | Gasstrom et al. | 403/101 |
| 2,842,850 | A * | 7/1958 | Anderson et al. | 33/458 |
| 3,112,135 | A * | 11/1963 | Salomonson | 294/119 |
| 3,199,905 | A * | 8/1965 | Johnson | 294/22 |
| 3,677,597 | A * | 7/1972 | Stipek | 294/209 |
| 5,647,622 | A * | 7/1997 | Schectman | 294/111 |
| 7,343,837 | B1 * | 3/2008 | Domanico et al. | 81/177.7 |
| 8,398,135 | B2 * | 3/2013 | Petty | 294/191 |

* cited by examiner

*Primary Examiner* — Dean Kramer
(74) *Attorney, Agent, or Firm* — Dinsmore & Shohl LLP

(57) ABSTRACT

An assist device includes a plurality of links that are connected to each other at connection junctions. A terminal link of the plurality of links includes a handle connection attached thereto. Another terminal link of the plurality of links includes a connection structure attaching a device to be passed about an object.

12 Claims, 8 Drawing Sheets

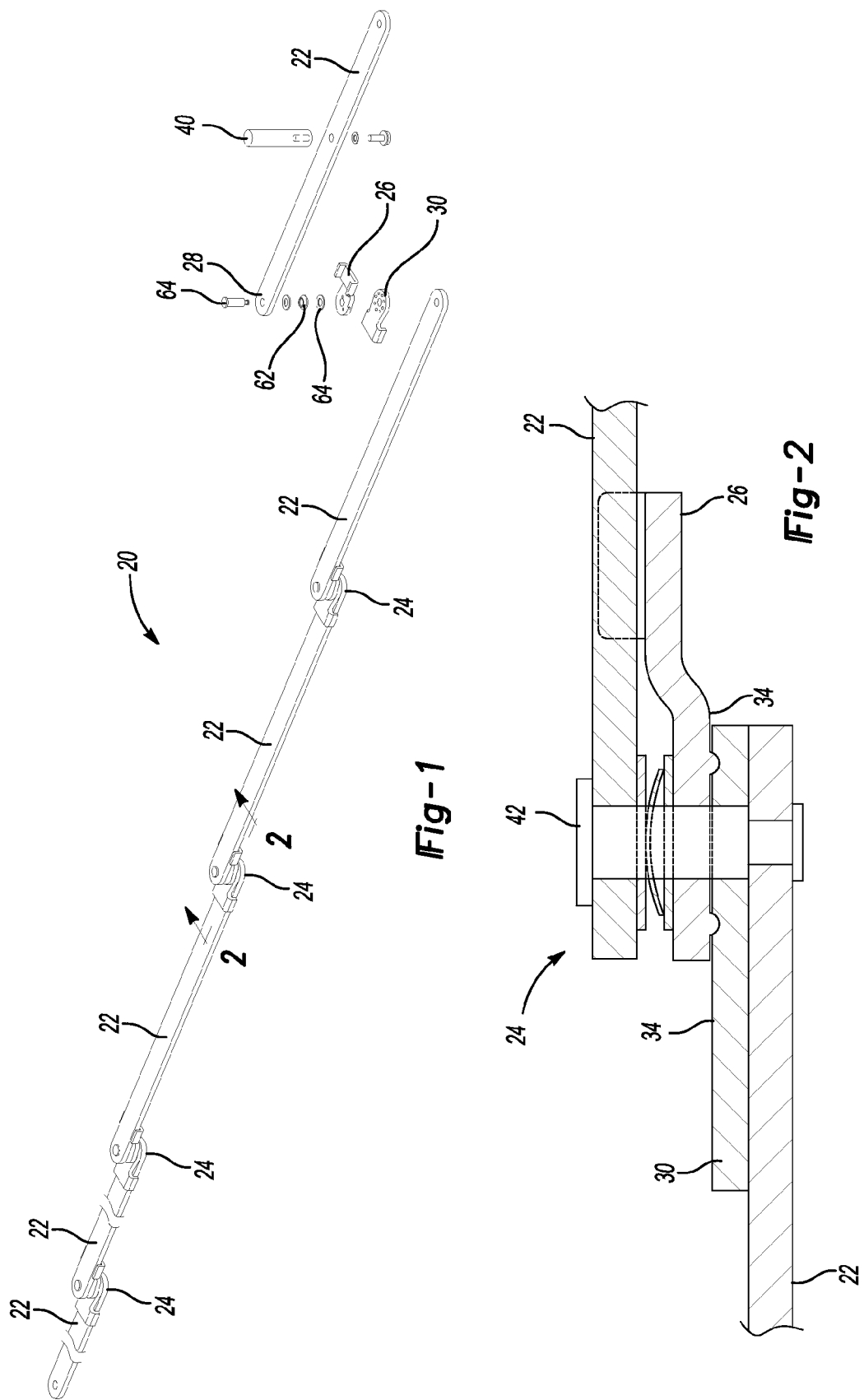

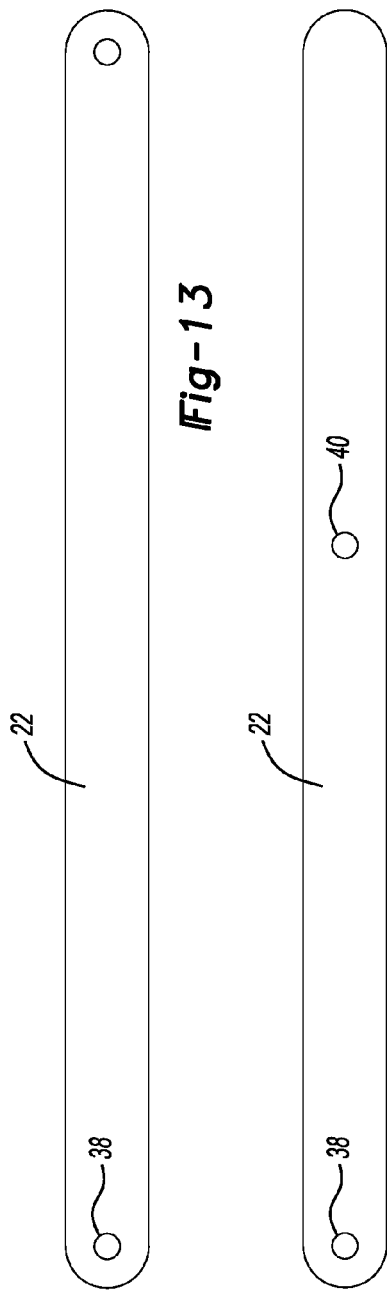
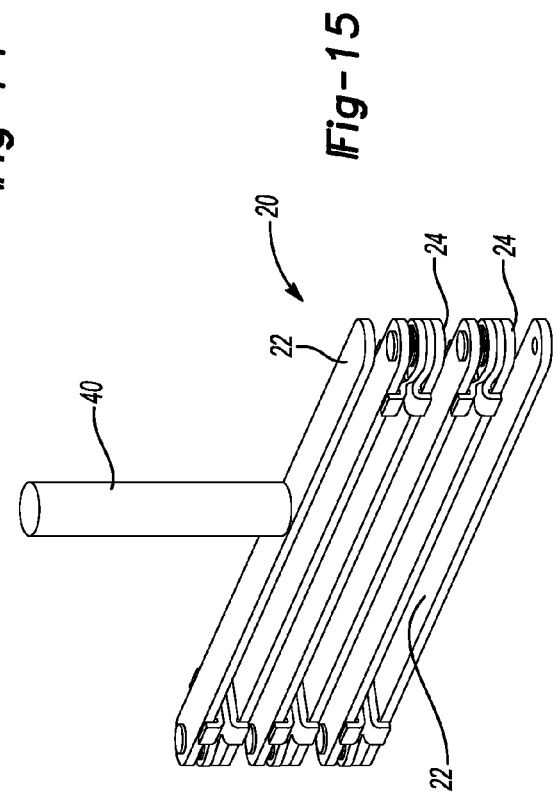

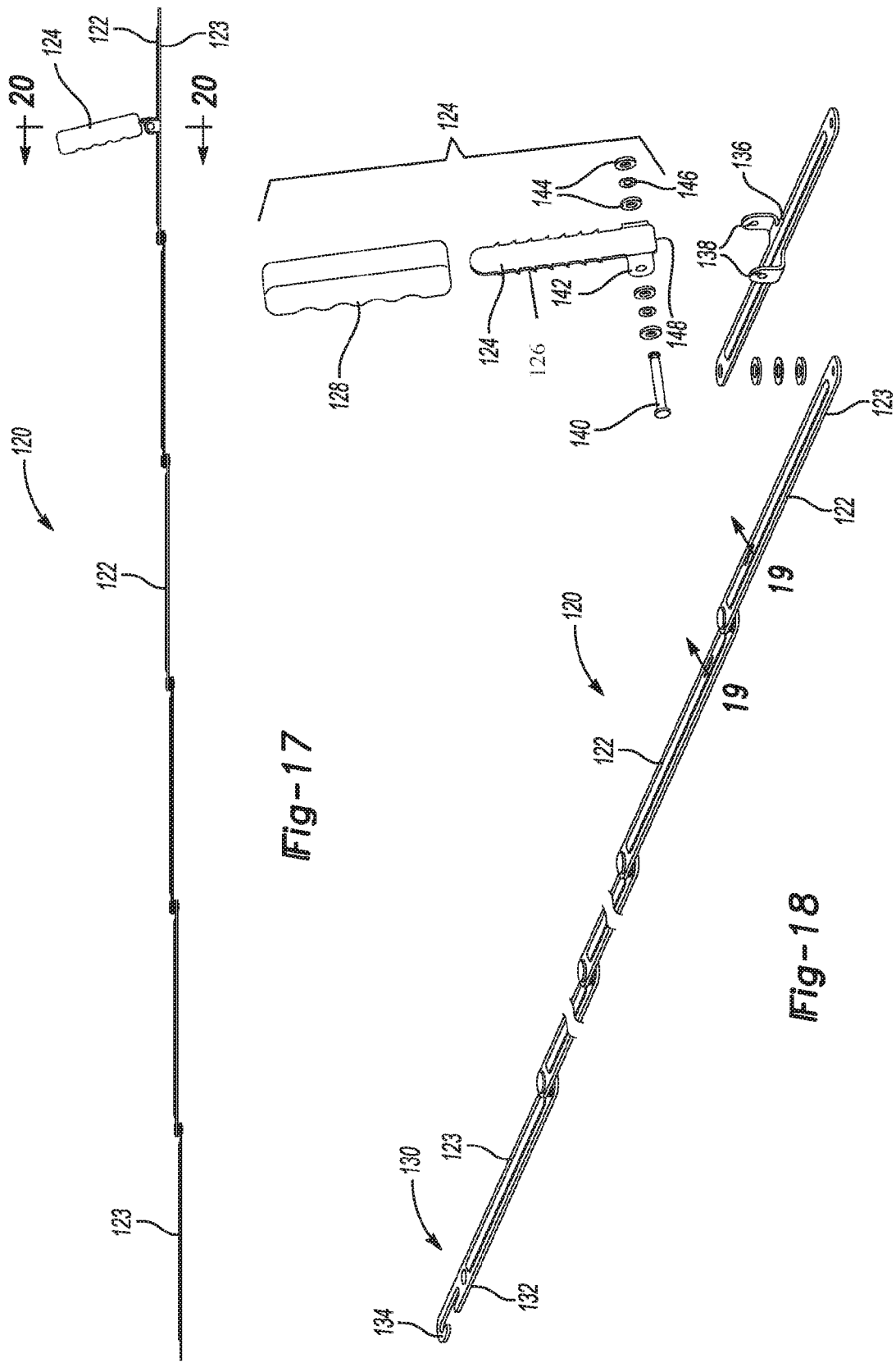

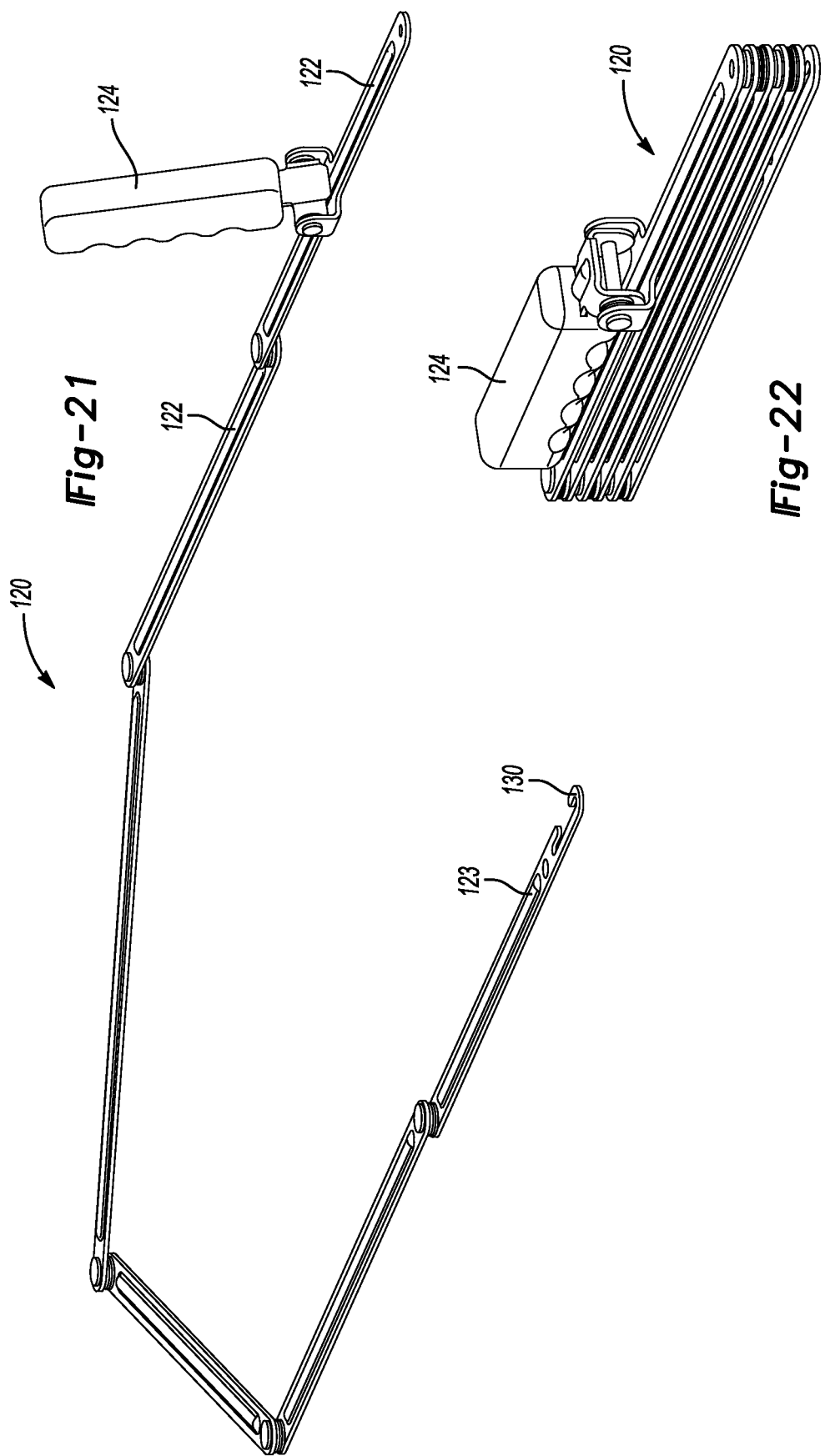

PASS AROUND ASSIST DEVICE

FIELD OF THE INVENTION

The invention relates to devices for passing a medium through or around an object.

BACKGROUND OF THE INVENTION

When positioning a tree stand at an elevated level in a tree, users may need to pass a strap or chain about the tree to secure the tree stand in position. Often, users have a difficult time passing the strap or chain around the tree and maintain a balanced position while hanging the tree stand. There is therefore a need for a device to safely aid in hanging a tree stand. There is also a need for a device that allows a user to pass a strap or chain around a tree while maintaining a secure position. There is a further need in the art for a device that can be utilized in a variety of trees and is adjustable to allow a strap or chain to be positioned about different types and sizes of trees.

SUMMARY OF THE INVENTION

In one aspect, there is disclosed an assist device that includes a plurality of links that are connected to each other at connection junctions. A terminal link of the plurality of links includes a handle connection attached thereon. Another terminal link of the plurality of links includes a connection structure attaching a device to be passed about an object.

In another aspect, there is disclosed an assist device that includes a plurality of links that are connected to each other at connection junctions. The connection junctions include connection holes formed through the links. The connection junctions also include a male component that is attached at one end of one of the links and a female component that is attached to an end of another link. The male component includes a connection hole and a plurality of protrusions formed on a contact surface. The female component includes a connection hole and plurality of slots formed on a contact surface wherein the protrusions and slots define an angular adjustment position of the links relative to each other. A pin passes through the connection holes of the links and male and female components allowing angular movement of the links relative to each other.

In a further aspect, there is disclosed an assist device that includes a plurality of links that are connected to each other at connection junctions. The connection junctions include holes formed through the links receiving a pin. A pair of flat washers is disposed about the pin and a torsion washer is disposed between the flat washers and about the pin. The flat washers apply a frictional force to the links to maintain a rotational position of the links relative to each other. A terminal link of the plurality of links includes a handle connection attached thereon. Another terminal link of the plurality of links includes a connection structure attaching a device to be passed about an object.

BRIEF DESCRIPTION OF THE DRAWINGS

FIG. 1 is an exploded perspective view of an assist device;
FIG. 2 is a partial sectional view taken along the line 2-2 of FIG. 1 detailing the connection junction;
FIG. 13 is a plan view of a link;
FIG. 14 is a top plan view of a link including an attachment point for a handle;
FIG. 15 is a perspective view of the tree stand assist device in a folded position;
FIG. 17 is a side view of another embodiment of an assist device;
FIG. 18 is an exploded perspective view of another embodiment of an assist device;
FIG. 21 is a perspective view of the assist device in an extended or actuated position for attaching a strap or chain about a tree or pole;
FIG. 22 is a perspective view of the tree stand assist device in a folded position.

DETAILED DESCRIPTION OF THE PREFERRED EMBODIMENTS

Figure 3:
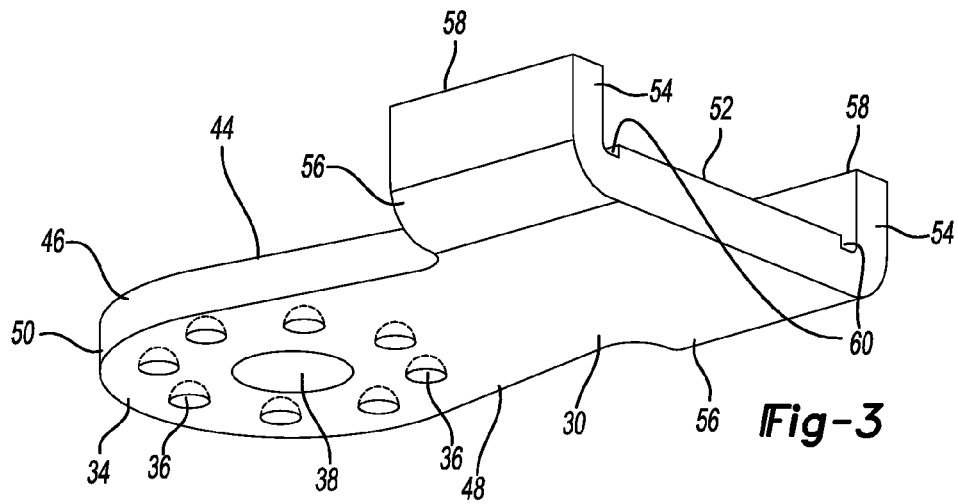
FIG. 3 is a perspective view of the female component.
Figure 4:
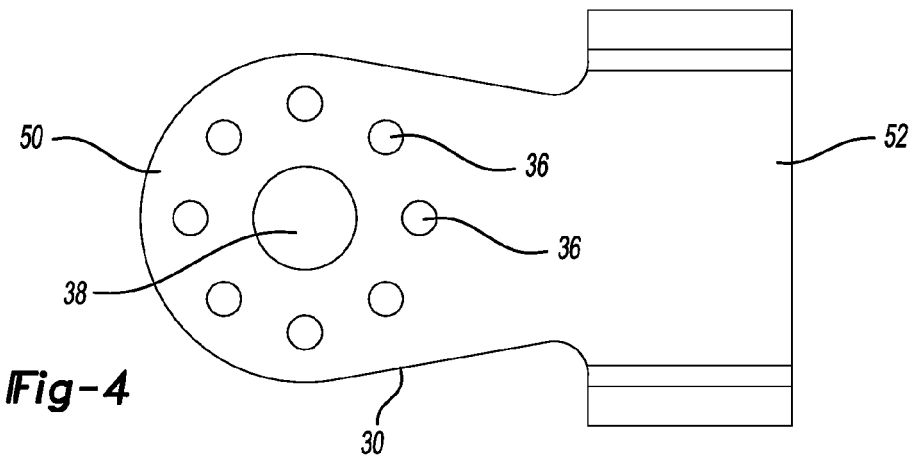
FIG. 4 is a top plan view of the female component.
Figure 5:
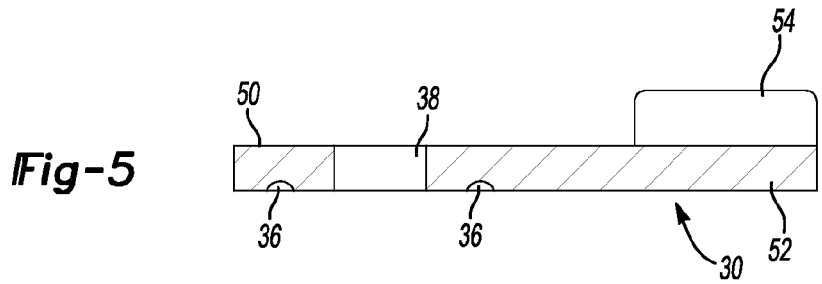
FIG. 5 is a sectional view of the female component.
Figure 6:
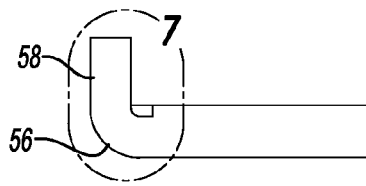
FIG. 6 is an end view of the female component.

Referring to FIGS. 1-16, there is shown an assist device 20 that includes a plurality of links 22 that are connected to each other at connection junctions 24. The connection junctions 24 include a male component 26 that is attached at an end 28 of one of the links 22. A female component 30 is attached to an end 28 of another link 22. The male component 26 includes a plurality of protrusions 32 formed on a contact surface 34. The female component 30 includes a plurality of slots 36 formed on a contact surface 34 such that the protrusions and slots 32, 36 define an angular adjustment position of the links 22 relative to each other.

Referring to FIGS. 1 and 2 and 13 and 14, the assist device 20 may include links 22 having connection holes 38 formed there through. In one aspect, the links 22 may also include a handle connection hole 40, as best shown in FIG. 14. The connection holes 38 of the links 22 may be aligned with connection holes 38 of the male and female components 26, 30 and be coupled by a pin or rivet 42 placed therein, as will be discussed in more detail below.

Referring to FIGS. 3 through 7, there is shown the female component 30 of the assist device 20. The female component 30 includes a body 44 including the contact surface 34 and an opposing surface 46 joined by an edge 48. The body 44 may include a contact portion 50 and link connecting portion 52 positioned laterally with respect to the contact portion 50. In one aspect, the contact portion 50 includes a connection hole 38 formed there through that receives the connecting pin 42, as described above. In one aspect, the plurality of slots 36 are formed on the contact surface 50 about the connection hole 38. It should be realized that various numbers of slots 36 may be formed in the contact surface 50 less than a total depth of thickness of the female component 30.

Figure 7:
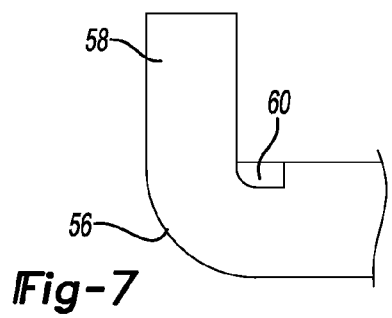
FIG. 7 is a partial detailed view as shown in FIG. 6 detailing the slots formed in the opposing walls.
Figure 8:
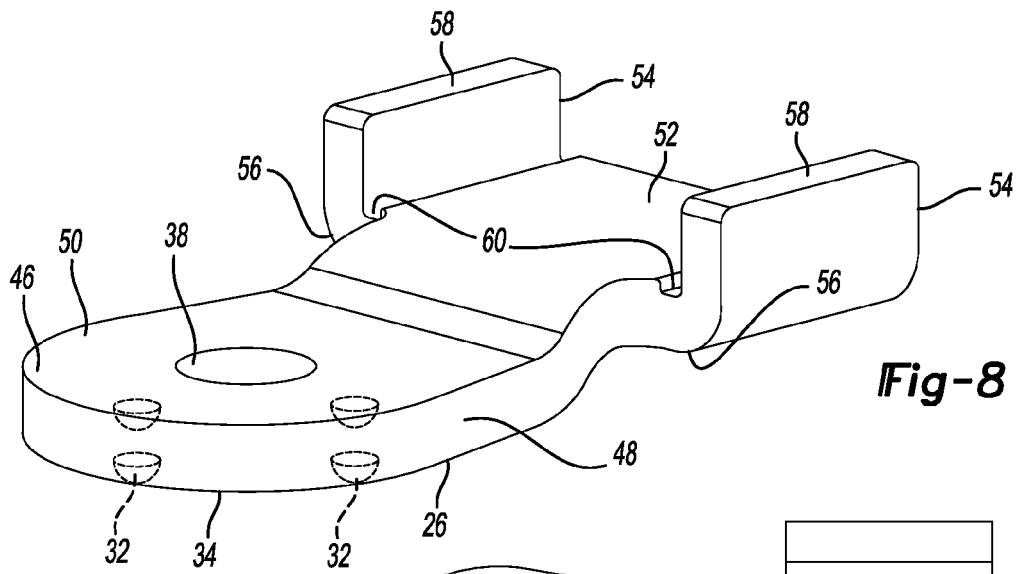
FIG. 8 is a perspective view of the male component.
Figure 9:
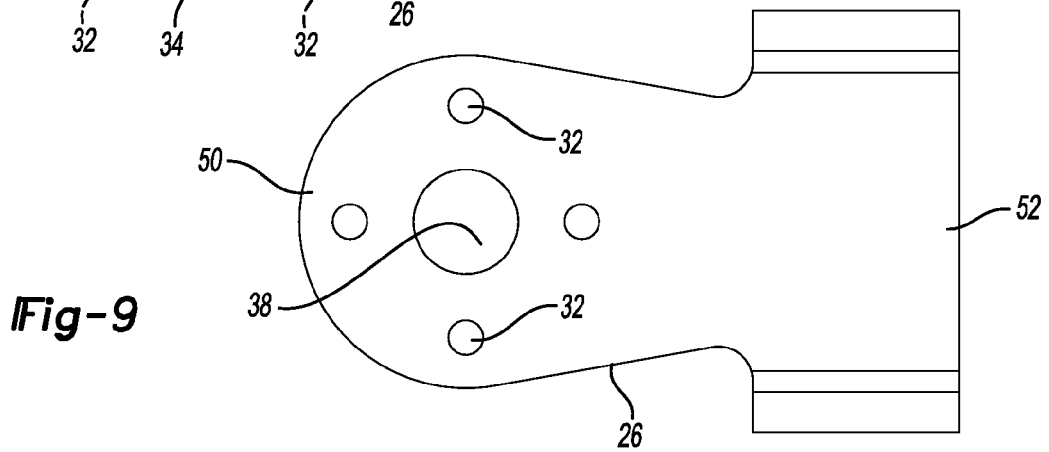
FIG. 9 is a top plan view of the male component.
Figure 10:
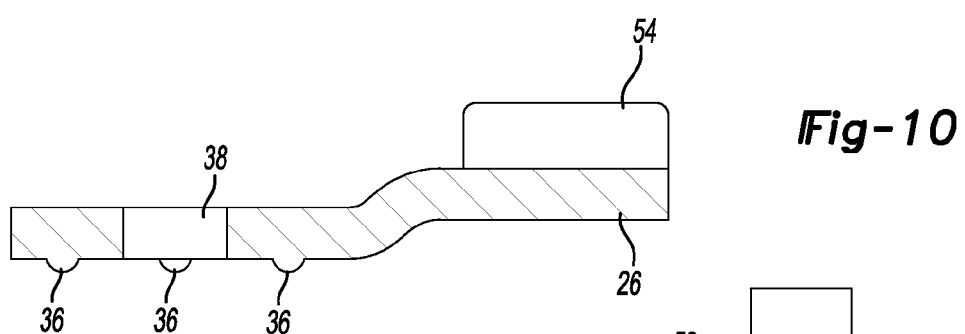
FIG. 10 is a sectional view of the male component.
Figure 11:
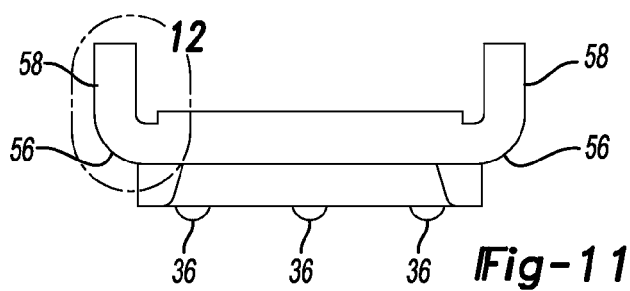
FIG. 11 is an end view of the male component.
Figure 12:
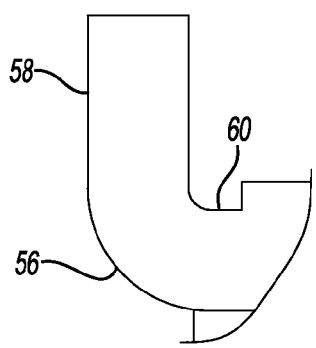
FIG. 12 is a detail view taken from FIG. 11 showing the slots formed in the opposing walls.

In one aspect, the link connecting portion 52 includes a pair of opposing walls 54 that extend from the edge 48 in a direction above the opposing surface 46. Each of the pair of walls 54 may include a radius portion 56 that extends from the edge 48 and terminates in a planer portion 58 that extends above the opposing surface 46. In one aspect, as best shown in FIGS. 7 and 8 the radius portion 56 may include a slot 60 formed therein that guides the links 22 into position relative to the female component 30 and aligns the connections holes 38.

Referring to FIGS. 8 through 12, there is depicted the male component 26 of the tree stand assist device 20. In one aspect, the male component 26 includes a body 44 that includes the contact surface 34 and an opposing surface 46 joined by an edge 48. The body 44 includes a contact portion 50 and a link connecting portion 52 positioned laterally and offset vertically with respect to the contact portion 50. The contact portion 50 may include a connection hole 38 formed there through that receives the connecting pin 42 as described above. In one aspect, the plurality of protrusions 32 may be formed on the contact surface 34 about the connection hole 38. As described above, various numbers of protrusions 32 may be formed about the connection hole 38 and may be received in various numbers of slots 36 in the female component 30. In one aspect, the male protrusions 32 have a size and shape such that they are positioned to temporarily engage the slots 36 of the female component 30 and maintain an angular position of the male component 26 relative to the female component 30 until a force is applied by a user to rotate the male component 26 relative to the female component 30 such that the protrusions 32 glide across the slots 36 until they are again positioned in a different slot 36 location after the force has been removed.

In one aspect, the male component 26 includes a link connecting portion 52 that has a pair of opposing walls 54 extending from the edge 48 in a direction above the opposing surface 46. In one aspect each of the pair of walls 54 includes a radius portion 56 that extends from the edge 48 and terminates in a planar portion 58 that extends above the opposing surface 46. As described above, the radius portions 56 include a slot 60 formed therein that guides the links 22 into position relative to the male component 26.

Referring to FIGS. 1 and 2, a curved spring 62 and washers 64 may be disposed about the pin 42 to assist in the angular movement of the links 22 relative to each other. It should be realized that various types of springs and washers may be utilized.

Figure 16:
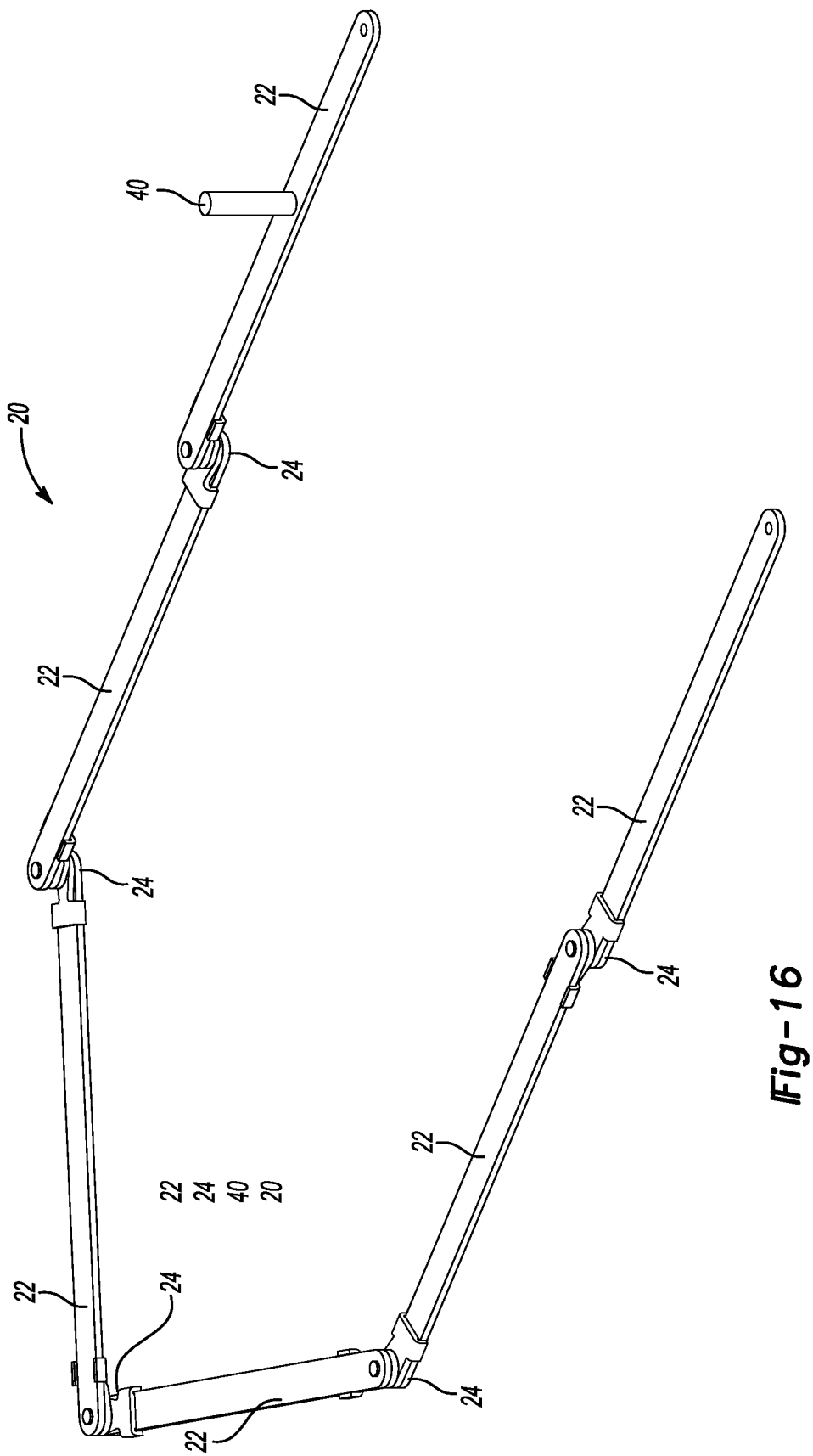
FIG. 16 is a perspective view of the assist device in an extended or actuated position for attaching a strap or chain about a tree or pole.
Figure 19:
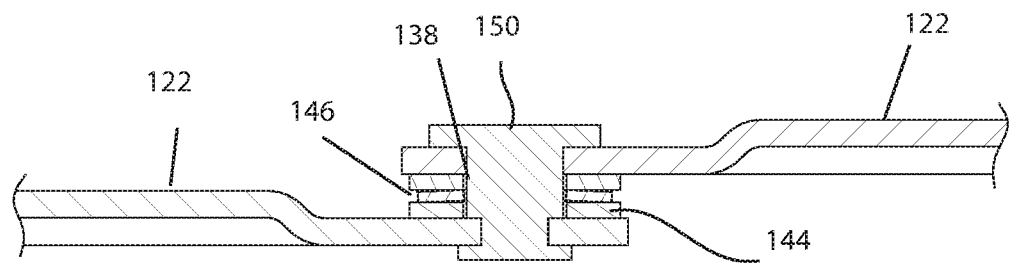
FIG. 19 is a partial sectional view detailing the connection junction.
Figure 20:
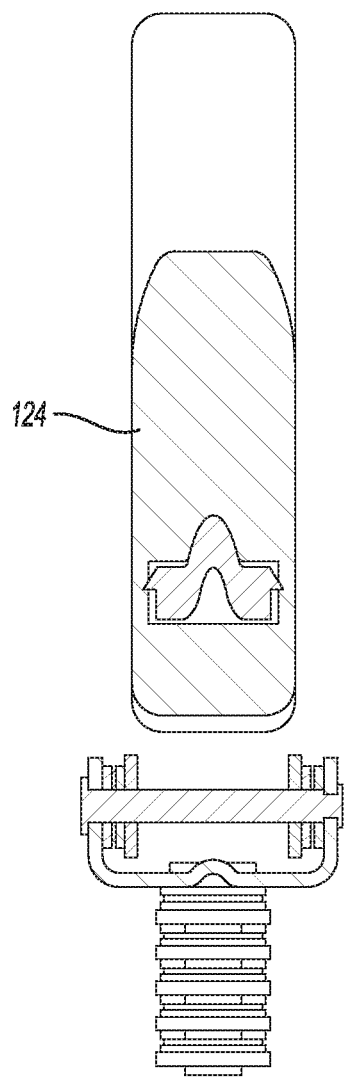
FIG. 20 is a partial sectional view detailing the handle.

In use, a user may utilize the assist device 20 and adjust the links 22 from a folding position, as best shown in FIG. 15 to an extended or used position as best shown in FIG. 16. It should be realized that the links 22 may be adjusted angularly relative to each other to provide various angular positions to accommodate the positioning of the assistance device about various size and types of objects in hard to reach situations.

A user may manipulate the angular position of the various linkages to provide an overall shape that passes about an object or positions the device in a hard to reach situation. A user may apply an angular force or torque to the links 22 such that the male component 26 and female component 30 are rotated about the pin 42. The protrusions 32 of the male component 26 slide across the contact surface 34 of the female component 30 until the force is removed and the protrusions 32 of the male component 26 are received in the slots 36 of the female component 30 to maintain the angular position of adjacent links 22. Additionally, a user may attach a chain or strap of a tree stand to an end of the assist device 20 at a terminal link 22 away from the handle connection 40 that is attached to another terminal link 22 such that the strap or chain may be passed about the tree by a user such that the user maintains a balanced and safe position while hanging a tree stand.

Referring to FIGS. 17-22 there is shown another embodiment of an assist device 120. In the depicted embodiment, the assist device 120 may include links 122 having connection holes 138 formed there through. In one aspect, the links 122 may also include a handle connection 124. The handle connection 124 may include a handle support 126 and a grip 128 disposed over the handle support 126.

The last or terminal link 123 opposite the handle connection 124 may include a connection structure 130. The connection structure 130 may include a hole 132 as shown in the first and second embodiments or a hook structure 134 as depicted in the second embodiment.

The handle connection 124 may include a bracket structure 136 attached to the link 122. The bracket structure 136 may include holes 138 on opposing sides allowing passage of a pin 140. The handle connection 124 includes an attachment bracket 142 that is positioned between the bracket structure 136 on the link 122. The pin 140 may be passed through the holes 138 in the bracket structure 136 and the holes 138 in the attachment bracket 142 to allow pivotal connection of the components. A pair of flat washers 144 and a torsion washer 146 is disposed about the pin 140 on both sides of the attachment bracket 136 to provide resistance of handle connection 124 to movement unless a predetermined force is applied to move it to a desired position. The torsion washer 146 includes a beveled profile that applies a frictional force between the flat washers 144 that engage the bracket attachment bracket 142 and the bracket structure 136.

In one aspect, the handle connection 124 includes a pivot structure 148 that has a tab that allows the handle to pivot flat to the link 122 in one direction while preventing pivoting flat in the opposing direction.

The connection holes 138 of the links 122 may be aligned and be coupled by a pin or rivet 150 placed therein. A pair of flat washers 144 and a torsion washer 146 is disposed about the rivet 150 to provide resistance of the links 122 to movement unless a predetermined force is applied to the links 122 to move them to a desired position. The torsion washer 146 includes a beveled profile that applies a frictional force to the flat washers 144 between the links 122. In one aspect, the predetermined force may be varied to provide a desired holding force. For example the holding force may be from 10 to 50 foot pounds of tension or may be 30 foot pounds of tension.

In use, a user may utilize the assist device 120 and adjust the links 122 from a folding position, as best shown in FIG. 22 to an extended or used position as best shown in FIG. 21. In the folded position the handle connection 124 of the second embodiment may be pivoted flat, as shown in FIG. 22.

The handle connection 124 of the second embodiment may be pivoted upward from the stowed position in FIG. 24 to the use position shown in FIG. 23. It should be realized that the links 122 may be adjusted angularly relative to each other to provide various angular positions to accommodate the positioning of the assistance device about various size and types of objects in hard to reach situations. Additionally, a user may attach a chain or strap of a tree stand to an end of the assist device 120 at a terminal link 122 away from the handle connection 124 that is attached to another terminal link 122 such that the strap or chain may be passed about the tree by a user such that the user maintains a balanced and safe position while hanging a tree stand.

I claim:
1. An assist device comprising:
a plurality of links connected to each other at connection junctions;
a terminal link of the plurality of links including a handle connection attached thereon;

another terminal link of the plurality of links including a connection structure attaching a device to be passed about an object and the handle connection including a bracket structure attached to the terminal link, the bracket structure including holes on opposing sides allowing passage of a pin wherein the handle connection includes an attachment bracket that is positioned between the bracket structure on the terminal link, the pin passing through the holes in the bracket structure and a hole in the attachment bracket to allow pivotal connection and a pair of flat washers and a torsion washer disposed about the pin on both sides of the attachment bracket providing resistance of the handle connection to movement unless a predetermined force is applied.

2. The assist device of claim 1 wherein the connection junctions include holes formed through the links receiving a pin, a pair of flat washers disposed about the pin and a torsion washer disposed between the flat washers and about the pin, the flat washers applying a frictional force to the links to maintain a rotational positional of the links relative to each other.

3. The assist device of claim 1 wherein the connection junctions include a male component attached at an end of one of the links and a female component attached to an end of another link, the male component including a plurality of protrusions formed on a contact surface and the female component including a plurality of slots formed on a contact surface wherein the protrusions and slots define an angular adjustment position of the links relative to each other.

4. The assist device of claim 3 wherein the female component includes a body including the contact surface and an opposing surface joined by an edge, wherein the body includes a contact portion and a link connecting portion positioned laterally with respect to the contact portion.

5. The assist device of claim 4 wherein the contact portion includes a connection hole formed there through receiving a connecting pin and wherein the plurality of slots are formed on the contact portion about the connection hole.

6. The assist device of claim 4 wherein the link connecting portion includes a pair of opposing walls extending from the edge in a direction above the opposing surface wherein each of the pair of walls includes a radiused portion that extends from the edge and terminates in a planar portion that extends above the opposing surface wherein the radiused portion includes a slot formed therein that guides the links into position relative to the female component.

7. The assist device of claim 3 wherein the male component includes a body including the contact surface and an opposing surface joined by an edge wherein the body includes a contact portion and a link connecting portion positioned laterally and offset vertically with respect to the contact portion and wherein the contact portion includes a connection hole formed there through receiving a connecting pin wherein the plurality of protrusions are formed on the contact surface about the connection hole.

8. The assist device of claim 7 wherein the link connecting portion includes a pair of opposing walls extending from the edge in a direction above the opposing surface wherein each of the pair of walls includes a radiused portion that extends from the edge and terminates in a planar portion that extends above the opposing surface wherein the radiused portion includes a slot formed therein that guides the links into position relative to the male component.

9. The assist device of claim 8 further including a curved spring and washers disposed about the pin.

10. The assist device of claim 3 wherein the links, female component and male component include connection holes formed there through and a pin passing through the connection holes of the links and male and female components allowing angular movement of the links relative to each other.

11. An assist device comprising:
a plurality of links connected to each other at connection junctions, the connection junctions include holes formed through the links receiving a pin, a pair of flat washers disposed about the pin and a torsion washer disposed between the flat washers and about the pin, the flat washers applying a frictional force to the links to maintain a rotational positional of the links relative to each other;
a terminal link of the plurality of links including a handle connection attached thereon;
another terminal link of the plurality of links including a connection structure attaching an object to be passed about an object and the handle connection including a bracket structure attached to the terminal link, the bracket structure including holes on opposing sides allowing passage of a pin wherein the handle connection includes an attachment bracket that is positioned between the bracket structure on the terminal link, the pin passing through the holes in the bracket structure and a hole in the attachment bracket to allow pivotal connection and a pair of flat washers and a torsion washer disposed about the pin on both sides of the attachment bracket providing resistance of the handle connection to movement unless a predetermined force is applied.

12. An assist device comprising:
a plurality of links connected to each other at connection junctions;
a terminal link of the plurality of links including a handle connection attached thereon;
another terminal link of the plurality of links including a connection structure attaching a device to be passed about an object wherein the connection junctions include a male component attached at an end of one of the links and a female component attached to an end of another link, the male component including a plurality of protrusions formed on a contact surface and the female component including a plurality of slots formed on a contact surface wherein the protrusions and slots define an angular adjustment position of the links relative to each other, the female component includes a body including the contact surface and an opposing surface joined by an edge, wherein the body includes a contact portion and a link connecting portion positioned laterally with respect to the contact portion.

\* \* \* \* \*